(12) United States Patent
Gray et al.

(10) Patent No.: US 6,387,170 B1
(45) Date of Patent: May 14, 2002

(54) HEAT STABLE ORANGE LAKED MONOAZO PIGMENT

(75) Inventors: Alan Gray, Mississauga; Henry Lui, Ajax; Dorothy-Grace Manarang-Pena, Pickering, all of (CA)

(73) Assignee: Dominion Colour Corporation, Toronto (CA)

( * ) Notice: Subject to any disclaimer, the term of this patent is extended or adjusted under 35 U.S.C. 154(b) by 0 days.

(21) Appl. No.: 09/648,623

(22) Filed: Aug. 28, 2000

(51) Int. Cl.[7] ............................................... C09B 63/00
(52) U.S. Cl. ....................... 106/402; 106/493; 106/496; 106/498; 106/31.77; 106/31.79; 106/524; 106/100; 106/534; 106/724
(58) Field of Search ................................. 106/402, 493, 106/496, 498, 31.77, 31.79; 524/100; 534/724

(56) References Cited

U.S. PATENT DOCUMENTS

| 3,997,523 A | * 12/1976 | Laubert et al. | .............. 534/864 |
| 5,997,628 A | * 12/1999 | Bindra | ........................ 106/496 |
| 6,294,012 B1 | * 9/2001 | Bindra | ........................ 106/496 |

FOREIGN PATENT DOCUMENTS

JP     50-67841      *  6/1975
JP     2-294363      *  12/1990

* cited by examiner

*Primary Examiner*—Anthony Green
(74) *Attorney, Agent, or Firm*—Robert F. Delbridge

(57) ABSTRACT

An orange laked monoazo pigment has the following formula (I):

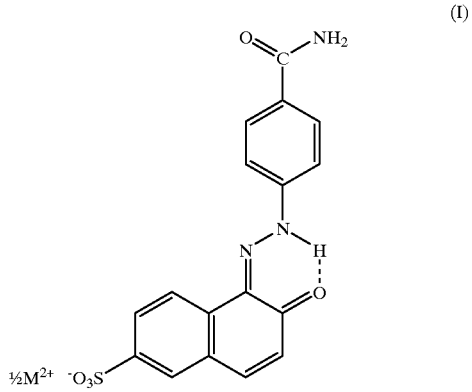

wherein M is an alkaline metal selected from the group consisting of calcium, barium, strontium, magnesium and manganese.

5 Claims, No Drawings

HEAT STABLE ORANGE LAKED MONOAZO PIGMENT

FIELD OF INVENTION

This invention relates to orange laked monoazo pigments, processes for their preparation and their use.

STATEMENT OF INVENTION

The present invention provides a water insoluble orange laked monoazo pigment having the formula (I):

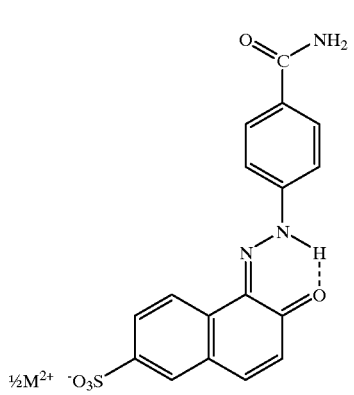

wherein M is an alkaline metal selected from the group consisting of calcium, barium, strontium, magnesium and manganese.

The invention also provides a colourant for the pigmenting of natural and synthetic materials comprising the above monoazo compound.

The invention further provides a process for preparing an orange laked monoazo pigment of the above formula comprising diazotizing p-aminobenzamide to produce a diazonium compound, coupling the diazonium compound with 1-hydroxy-napthalene-6-sulphonic acid to form an azo dye, and metallizing the azo dye with a salt of M to form a slurry of orange laked monoazo pigment of the above formula, and separating the pigment from the remainder of the slurry.

An orange laked monoazo pigment of formula (I) is a very good orange pigment which is distinguished in particular by excellent heat stability. The pigment can be used, for the pigmenting of printing inks, paints, thermoplastic and thermosetting materials, natural resins and synthetic resins, polystyrene and its mixed polymers, polyolefins, in particular polyethylene and polypropylene and polyvinyl compounds, for example polyvinyl chloride.

DESCRIPTION OF EXAMPLES

Examples of the invention will now be described. In the examples, parts and percentages are given by weight, unless stated otherwise. Parts by volume relate to parts by weight as the litre relates to the kilogram.

EXAMPLE 1

40.8 parts of p-aminobenzamide were dissolved in 600 parts water at 15° C. and 66 parts of 31.5% hydrochloric acid. The solution was cooled to 8° C. in an ice bath, then diluted with 750 parts water and diazotized with 108 parts by volume of 20% sodium nitrite to produce a diazo solution. 77.6 parts of 2-hydroxy-naphthalene-6-sulfonic acid were dissolved in 242 parts of water at 15° C. and 465 parts of 10% sodium hydroxide solution. The resultant solution was ten diluted with 1000 parts of water and 300 parts of 20% acetic acid solution were added to produce a coupling component.

The diazo solution was slowly run into the coupling component at 20° C. ensuring that the pH was 7.0 after the strike. 174.2 parts by volume of 20% calcium chloride were added and the mixture heated to 90° C. The resultant pigment suspension was stirred at 90° C. for 15 minutes, then filtered, washed and dried at 90° C. to produce an orange laked monoazo pigment having the formula (I).

EXAMPLE 2

The procedure of Example 1 was repeated, except that 289.5 parts by volume of 20% barium chloride were used in place of the calcium chloride solution to produce a redder shade orange pigment.

EXAMPLE 3

The procedure of Example 1 was repeated, except that 501.6 parts by volume of 10% strontium nitrate were used in place of the calcium chloride solution to produce a redder shade orange pigment.

EXAMPLE 4

The procedure of Example 1 was repeated, except that 225.7 parts of volume of 10% magnesium chloride were used on place of the calcium chloride solution to produce an orange pigment.

EXAMPLE 5

The procedure of Example 1 was repeated, except that 357.9 parts by volume of 10% manganese sulfate were used in place of the calcium chloride solution to produce an orange pigment.

Other examples of the invention will be readily apparent to a person skilled in the art from the foregoing description, the scope of the invention being defined in the appended claims.

What is claimed is:
1. An orange laked monoazo pigment having the following formula (I):

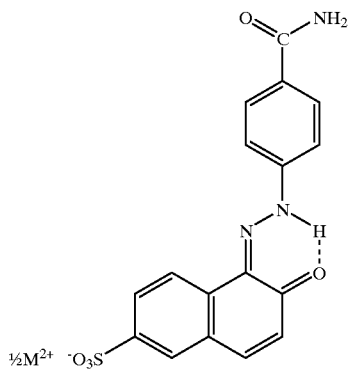

wherein M is an alkaline metal selected from the group consisting of calcium, barium, strontium, magnesium and manganese.

2. A colourant for the pigmenting of natural and synthetic materials comprising the orange laked pigment of claim 1.

3. A colourant for the pigmenting of printing inks, paints, thermoplastic, thermosetting materials, natural resins, synthetic resins, polystyrene and its mixed polymers, polyolefins, and polyvinyl compounds comprising the orange laked monoazo pigment of claim 1.

4. A colourant for the pigmenting of polystyrene, polyvinyl chloride, polyethylene and polypropylene comprising the orange laked monoazo pigment of claim 1.

5. A process for preparing an orange laked monoazo pigment having the following formula(I):

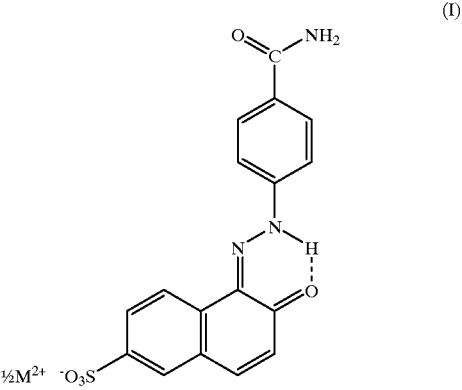

wherein M is an alkaline metal selected from the group consisting of calcium, barium, strontium, magnesium and manganese, the process comprising diazotizing p-aminobenzamide to produce a diazonium compound, coupling the diazonium compound with 2-hydroxy-naphthalene-6-sulfonic acid to form an azo die, metallizing the azo dye with a salt of M to form a slurry of orange laked monoazo pigment of formula (I), and separating the pigment from the remainder of the slurry.

* * * * *